United States Patent [19]
Berth

[11] 3,820,948
[45] June 28, 1974

[54] PROCESS OF DYEING HUMAN HAIR BASED ON PYRAZOLONE COMPOUNDS

[75] Inventor: Peter Berth, Leichlingen, Germany

[73] Assignee: Therachemie Chemisch Therapectische Gesellschaft m.b.H., Dusseldorf, Germany

[22] Filed: July 30, 1971

[21] Appl. No.: 167,855

Related U.S. Application Data

[63] Continuation-in-part of Ser. No. 721,941, April 17, 1968, abandoned.

[52] U.S. Cl. .......................................... 8/10.2, 8/11
[51] Int. Cl. .............................................. A61k 7/12
[58] Field of Search ................... 8/10.2, 11; 96/56.5

[56] References Cited
UNITED STATES PATENTS
3,617,167  11/1971  Berth et al. ............................ 8/10.2

Primary Examiner—Albert T. Meyers
Assistant Examiner—Dale R. Ore
Attorney, Agent, or Firm—Hammond & Littell

[57] ABSTRACT

Process for the dyeing of human hair utilizing an aqueous solution containing from 0.1 to 5 percent by weight of dyes for application to hair, including living human hair, which contain as active components, a 3-substituted pyrazolone and an aromatic bi- or polyfunctional amine having at least one primary amino group and another functional group in para-position, or else a 4-aminopyrazolone. These dyes are applied in aqueous solution or preferably in the form of an aqueous cream or emulsion and may contain thickeners, grooming agents, perfumes. They may be in the form of a shampoo. Application to the hair is carried out at temperatures of 15° to 40° C., preferably at room temperature, and the time required is approximately 20 to 25 minutes. The dyes, in contrast to conventional ones, can be removed from the hair with reducing agents.

6 Claims, No Drawings

PROCESS OF DYEING HUMAN HAIR BASED ON PYRAZOLONE COMPOUNDS

REFERENCE TO PRIOR APPLICATIONS

This application is a continuation-in-part of my co-pending U.S. Pat. application Ser. No. 721,941, filed Apr. 17, 1968, now abandoned.

Dyeing of human hair with oxidation dyes is known wherein the dyes are developed by atmospheric oxygen or by chemical oxidizers. It also is known to employ agents containing p-aminodimethylaniline in combination with 1-phenyl-3-methyl-pyrazolone.

It now has been found, and is the object of this invention, how to improve the intensity and fastness of the dyes. This is accomplished by dyeing hair, including living human hair, with the agents described hereinbelow.

The novel agents are oxidation dyes which are characterized by a content of a. pyrazolones of the generic formula (1)

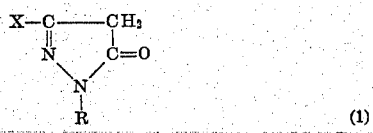

(1)

wherein R is hydrogen, an alkyl having 1 to 6 carbon atoms or phenyl, preferably hydrogen or phenyl, and X is an $NH_2$, $NHR_1$, $NR_1R_2$ or OH group, $R_1$ and $R_2$ being alkyls having 1 to 4 carbon atoms, preferably amino or hydroxyl, and b. aromatic, bi- or polyfunctional amines having at least one primary amino group and another functional group in para-position, or else a 4-aminopyrazolone.

Preferred 4-aminopyrazolones are compounds of the generic formula (2)

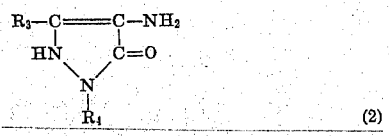

(2)

wherein $R_3$ and $R_4$ are hydrogen or an organic radical having 1 to 10 carbon atoms.

The organic radical $R_3$ can be an alkyl having 1 to 10 carbon atoms, an aryl, such as phenyl, hydroxyphenyl, sulfonylphenyl, sulfonamidophenyl, aminophenyl, lower alkylolphenyl, lower alkylphenyl, lower alkylaminophenyl and dilower alkylaminophenyl where the alkyls and alkylols have 1 to 4 carbon atoms, or a heterocyclic radical, such as the pyridyl. Functional groups may be present, particularly on the aryl, as indicated above, such as OH, $NH_2$, $NHCH_3$, $N(CH_3)_2$ or halogen atoms, i.e., fluorine, iodine, bromine, and particularly chlorine. Furthermore, the following groups may be present as organic radicals: COOH, COOR', $CONH_2$, CONHR', CONR'R'', wherein R' and R'' are alkyl or hydroxyalkyl having 1 to 4 carbon atoms.

The organic radical $R_4$ can be an alkyl having 1 to 10 carbons, an aryl, such as those mentioned above for $R_3$, or a heterocyclic radical, such as the pyridyl. Functional groups may be present. Particularly, hydrocarbon radicals having 1 to 10 carbons are applicable containing as functional groups OH, $NH_2$, COOH, $CONH_2$, $SO_3H$ and $SO_2NH_2$.

As aromatic radical, a phenyl is especially applicable. It may be substituted with alkyl or hydroxyalkyl groups having 1 to 4 carbons or other substituents, such as halogen, preferably Cl, $NH_2$, OH, COOH, $CONH_2$, CONHR', CONR'R'', $SO_3H$ and $SO_2NH_2$.

It frequently is opportune to employ the 4-aminopyrazolones in the form of their water-soluble acid addition salts, such as the hydrochloride, sulfate or oxalate, because the resistance to atmospheric air is increased. 4-Aminopyrazolones which are suitable in the process of the invention as component (b) are as follows:

1-ethyl-4-aminopyrazolone
1-n-hexyl-4-aminopyrazolone
1-n-decyl-4-aminopyrazolone
1-phenyl-4-aminopyrazolone
1-(p-hydroxyphenyl)-4-aminopyrazolone
1-(p-sulfonylphenyl)-4-aminopyrazolone
3-methyl-4-aminopyrazolone
3-i-propyl-4-aminopyrazolone
3-n-octyl-4-aminopyrazolone
3-phenyl-4-aminopyrazolone
3-(p-ethylphenyl)-4-aminopyrazolone
3-(p-aminophenyl)-4-aminopyrazolone
3-(p-dimethylaminophenyl)-4-aminopyrazolone
3-(m-chlorophenyl)-4-aminopyrazolone
3-(4-pyridyl)-4-aminopyrazolone
1-methyl-3-phenyl-4-aminopyrazolone
1-ethyl-3-(o-hydroxyphenyl)-4-aminopyrazolone
1-n-decyl-3-(p-methylaminophenyl)-4-aminopyrazolone
1-phenyl-3-n-butyl-4-aminopyrazolone
1-(p-sulfonamidophenyl)-3-n-octyl-4-aminopyrazolone
1-(p-sulfonamidophenyl)-3-phenyl-4-aminopyrazolone
1-(p-ethylphenyl)-3-phenyl-4-aminopyrazolone
1-(p-beta-hydroxyethylphenyl)-3-phenyl-4-aminopyrazolone
1-(p-hydroxyphenyl)-3-n-octyl-4-aminopyrazolone
1-(p-carboxyphenyl)-3-n-octyl-4-aminopyrazolone
1-(p-carbamidophenyl)-3-n-octyl-4-aminopyrazolone
4-aminopyrazolone-3-carboxylic acid
4-aminopyrazolone-3-carboxylic acid-ethyl ester
4-aminopyrazolone-3-carboxylic acid-n-butyl ester
4-aminopyrazolone-3-carboxylic acid-methylamide
4-aminopyrazolone-3-carboxylic acid-hydroxymethylamide
4-aminopyrazolone-3-carboxylic acid-di-n-butylamide
4-aminopyrazolone-3-carboxylic acid-ethyl-beta-hydroxyethylamide
1-methyl-4-aminopyrazolone-3-carboxylic acid-ethyl ester
1-methyl-4-aminopyrazolone-3-carboxylic acid-n-propylamide
1-methyl-4-aminopyrazolone-3-carboxylic acid-beta-hydroxypropylamide
1-ethyl-4-aminopyrazolone-3-carboxylic acid-methyl ester
1-ethyl-4-aminopyrazolone-3-carboxylic acid-amide
1-n-propyl-4-aminopyrazolone-3-carboxylic acid-beta-hydroxybutylamide 1-i-propyl-4-aminopyrazolone-3-carboxylic acid-beta-hydroxyethylamide
1-n-butyl-4-aminopyrazolone-3-carboxylic acid-methyl ester
1-n-hexyl-4-aminopyrazolone-3-carboxylic acid-methyl ester
1-n-heptyl-4-aminopyrazolone-3-carboxylic acid
1-n-decyl-4-aminopyrazolone-3-carboxylic acid-di-n-propylamide
1-n-decyl-4-aminopyrazolone-3-carboxylic acid-beta-hydroxyethyl ester
1-phenyl-4-aminopyrazolone-3-carboxylic acid
1-phenyl-4-aminopyrazolone-3-carboxylic acid-ethyl ester
1-phenyl-4-aminopyrazolone-3-carboxylic acid-$\beta$-hydroxyethyl ester
1-phenyl-4-aminopyrazolone-3-carboxylic acid-amide
1-phenyl-4-aminopyrazolone-3-carboxylic acid-ethylamide
1-phenyl-4-aminopyrazolone-3-carboxylic acid-beta-hydroxyethylamide
1-phenyl-4-aminopyrazolone-3-carboxylic acid-dimethylamide
1-(p-i-propylphenyl)-4-aminopyrazolone-3-carboxylic acid
1-(p-hydroxyphenyl)-4-aminopyrazolone-3-carboxylic acid-ethyl ester
1-(p-aminophenyl)-4-aminopyrazolone-3-carboxylic acid-amide
1-(o-carboxyphenyl)-4-aminopyrazolone-3-carboxylic acid-ethyl ester
1-(p-sulfonylphenyl)-4-aminopyrazolone-3-carboxylic acid-ethyl ester
1-(p-sulfonamidophenyl)-4-aminopyrazolone-3-carboxylic acid-ethyl ester
1-(2-pyridyl)-4-aminopyrazolone-3-carboxylic acid-diethylamide These compounds may be used as such or in the form of their water-soluble acid addition salts.

Suitable aromatic bi- and polyfunctional amines having atleast one primary amino group and another functional group in para-position are, e.g., p-phenylenediamine, p-toluylenediamine, p-diaminoanisole, p-aminomethylaniline, p-aminoethylaniline, p-aminodiphenylamine, p-aminodimethylaniline, p-aminodiethylaniline, p-aminodi-beta-hydroxyethylaniline, p-amino-phenol, or compounds of the kind named which additionally contain one or more functional groups such as OH, NH$_2$, NHR', NR'R'', wherein R' and R'' again are lower alkyls or hydroxyalkyls having 1 to 4 carbon atoms.

Preferably, these aromatic bi- and polyfunctional amines have the formula

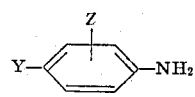

wherein Y is a member selected from the group consisting of OH, NH$_2$, NHR', NR'R'' and NHC$_6$H$_5$ and Z is a member selected from the group consisting of H, R', Y and OR', where again R' and R'' are alkyls or hydroxyalkyls having 1 to 4 carbon atoms.

These aromatic bi- or polyfunctional amines advantageously are employed in substantially equimolar amounts, calculated on the pyrazolones substituted in the 3-position. However, it is not disadvantageous to apply these pyrazolones in a given excess or in amounts slightly less than molar. Mixtures of the individual dyestuff components can be used.

Dyeing of the hair is carried out in aqueous media and, as customary for oxidation dyes, developed either by the action of atmospheric oxygen or by means of chemical oxidizers, preferably hydrogen peroxide or its adducts on urea, melamine, or sodium borate. Effective temperatures are substantially 15° to 40° C, preferably room temperature.

The aqueous media may be solutions or, preferably, creams or emulsions. To make such creams or emulsions, any desired surfactants may be employed, but especially anionic or non-ionic detergents or wetting agents. Suitable surfactants are particularly alkylbenzenesulfonates, higher fatty alcohol sulfates, higher alkylsulfonates, higher fatty acid ethanolamides, ethylene oxide adducts on higher fatty alcohols and alkylphenols.

The dyeability of the materials named is not diminished in the presence of the surfactants or, in other words, when applied in cream form. Thus, the dyeing agents according to the invention can be manufactured in the form of shampoos, particularly cream shampoos, as frequently is desired in practice.

Moreover, other agents can be incorporated into the agents, such as thickeners in the form of methyl-or hydroxymethyl-cellulose, starch, higher fatty alcohols, petrolatum (vaseline), paraffin oils and higher fatty acids. Perfumes, i.e., essential oils, or hair grooming agents such as pantothenic acid and cholesterol, also may be incorporated.

Effective amounts of the additives named above are those customarily employed. Effective amounts for surfactants range from 0.5 to 30 percent, for thickeners from 0.1 to 25 percent, and the effective concentration of the dyestuffs, depending upon the use, from 0.1 to 5 percent by weight, preferably 0.1 to 2 percent by weight. All these percentages are by weight and calculated on the total composition.

The hair dyes can be applied to the hair in weakly acid, neutral and preferably alkaline pH ranges. They have good light fastness, washing and rubbing resistance and, in contrast to conventional oxidation dyes, can readily be removed with reducers, e.g., sodiumhydroxy-methanesulfinate.

The invention will now be more fully explained by the following examples. However, it should be understood that these are given merely by way of illustration, and not of limitation, and that it is intended to cover all variations and modifications which do not constitute a departure from the spirit and the scope of the invention as hereinafter claimed.

In the examples, parts and percentages are by weight. Temperatures are in degrees centigrade. The solutions are aqueous.

EXAMPLE 1

In an emulsion of 10 parts fatty alcohols (C$_{16}$–C$_{18}$), 10 parts fatty alcohol sulfate, technical (C$_{16}$–C$_{18}$) and 75 parts water, 2.835 parts (0.01 mol) of the hydrochloride of 1-phenyl-4-aminopyrazolone-3-carboxylic acid-ethyl ester and 0.99 parts (0.01 mol) of 3- aminopyrazolone were dissolved. The pH was adjusted to 9.5 with ammonia. The mixture was made up to 100 parts with water.

The cream dye was mixed with 3.3 parts $H_2O_2$ (30 percent) and, when applied to naturally grey human hair at 15° to 40° C, imparted an orange-brown color thereto within 20 minutes.

EXAMPLE 2

Under the conditions set forth in the preceding example, but while using the components named as (a) and (b) in Table I, living human grey hair was treated. The pH employed and the color obtained also are listed in Table I.

The dyestuff components were used in equimolar amounts, and the total quantity of the components was 3 gm in the emulsion, the time for dyeing 25 minutes at room temperature.

TABLE 1

| No. | (a) | (b) | pH | Color |
|---|---|---|---|---|
| 1 | 3-aminopyrazolone | 4-aminopyrazolone-3-carboxylic acid ethyl ester-hydrochloride | 9 | orange-brown |
| 2 | 1-phenyl-3-aminopyrazolone | 1-phenyl-4-aminopyrazolone-3-carboxylic acid amide hydrochloride | 7 | orange-brown |
| 3 | 3-aminopyrazolone | 1-phenyl-4-aminopyrazolone-3-carboxylic acid-β-hydroxyethylamide-hydrochloride | 9.5 | orange-brown |
| 4 | 3-aminopyrazolone | p-toluylenediamine | 9.5 | soft brown |
| 5 | 1-phenyl-3-aminopyrazolone | p-aminophenol | 9.5 | deep brown |
| 6 | 3-aminopyrazolone | p-dimethylaminoaniline | 10 | red-purple |
| 7 | 1-phenyl-3-aminopyrazolone | p-dimethylaminoaniline | 7 | red-purple |
| 8 | 1-phenyl-3-aminopyrazolone | p-dimethylaminoaniline | 9.5 | red-purple |
| 9 | 1-phenyl-3-hydroxypyrazolone | 1-phenyl-4-aminopyrazolone-3-carboxylic acid amide-hydrochloride | 7.5 | yellow |
| 10 | 1-phenyl-3-hydroxy-pyrazolone | 1-phenyl-4-aminopyrazolone-3-carboxylic acid amide hydrochloride | 9.5 | yellow |
| 11 | 1-phenyl-3-aminopyrazolone | p-diaminoanisole | 9.5 | brown-purple |

Likewise very good dyeings of hair with intensive colors were obtained by using any of the other 3-aminopyrazolones of the general formula (1) and the aromatic, bi- or polyfunctional amines having at least one primary amino group and another functional group in para-position or 4-aminopyrazolones of the generic formula (2), named in the description instead of the above listed components (a) and (b).

EXAMPLE 3

In the same procedure, as in Example 1, dyeing creams were prepared, that contained as coupling component 3-aminopyrazolone and as development component each time one of the following 4-pyrazolones:

1. 4-aminopyrazolone-3-carboxylic acid-n-butyl ester
2. 1-methyl-4-aminopyrazolone-3-carboxylic acid-ethyl ester
3. 1-i-propyl-4-aminopyrazolone-3-carboxylic acid-di-β-hydroxyethylamide
4. 1-n-butyl-4-aminopyrazolone-3-carboxylic acid-methyl ester
5. 1-n-hexyl-4-aminopyrazolone-3-carboxylic acid-ethyl ester
6. 1-phenyl-3-methyl-4-aminopyrazolone
7. 1-phenyl-4-aminopyrazolone-3-carboxylic acid
8. 1-phenyl-4-aminopyrazolone-3-carboxylic acid-ethylamide
9. 1-phenyl-4-aminopyrazolone-3-carboxylic acid-dimethylamide
10. 1-(p-sulfonamidophenyl)-3-n-octyl-4-aminopyrazolone
11. 1-(p-sulfonamidophenyl)-3-phenyl-4-aminopyrazolone
12. 1-(p-sulfonamidophenyl)-4-aminopyrazolone-3-carboxylic acid-ethyl ester Naturally grey hair treated with these dyeing creams was dyed a yellow to orange-brown shade. The dyeing is practically unchanged if the $SO_2NH_2$-group in the compounds 10, 11 and 12 is replaced by one of the following groups: OH, $NH_2$, $C_2H_5$, $C_2H_5OH$, COOH, $CONH_2$ or $SO_3H$.

The preceding specific embodiments are illustrative of the practice of the invention. It is to be understood, however, that other expedients known to those skilled in the art or disclosed herein may be employed without departing from the spirit of the invention or the scope of the appended claims.

I claim:

1. In the process for the dyeing of living human hair which comprises treating the hair at temperatures ranging substantially from 15° to 40° C for a time sufficient to effect dyeing with a composition for dyeing human hair comprising an oxidation dyestuff and an aqueous media in the presence of a chemical oxidizing agent and thereafter rinsing the hair, the improvement which consists in utilizing as said oxidation dyestuff, of from 0.1 to 5 percent by weight, based on the total composition, of a mixture of component (a) and component (b) in substantially equimolar amounts, said component (a) being a pyrazolone of the formula

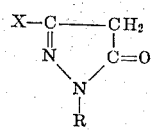

wherein R is a member selected from the group consisting of hydrogen and phenyl and X is a member selected from the group consisting of amino and hydroxyl and said component (b) being selected from the group consisting of 1. aromatic polyfunctional amines of the formula

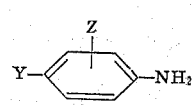

wherein Y is a member selected from the group consisting of OH, $NH_2$, NHR′, NR′R″ and $NHC_6H_5$ and Z is a member selected from the group consisting of H, R′, Y and OR′, where R′ and R″ are members selected from the group consisting of alkyl and hydroxyalkyl having from 1 to 4 carbon atoms, 2. 4-aminopyrazolones of the formula

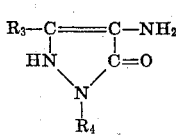

wherein $R_3$ is a member selected from the group consisting of hydrogen, phenyl, chlorophenyl, hydroxyphenyl, aminophenyl, alkylphenyl, alkylaminophenyl, di-alkylaminophenyl, where the alkyl and alkylols have 1 to 4 carbon atoms, pyridyl, COOH, COOR', $CONH_2$, CONHR' and CONR'R'' where R' and R'' have the above defined meanings, and $R_4$ is a member selected from the group consisting of hydrogen, phenyl, hydroxyphenyl, sulfonylphenyl, sulfonamidophenyl, aminophenyl, carboxyphenyl, carbamidophenyl, alkylolphenyl, alkylphenyl, alkylaminophenyl, dialkylaminophenyl, where the alkyls and alkylol have 1 to 4 carbon atoms, and pyridyl, and 3. water soluble acid addition salts of said 4-aminopyrazolones.

2. An aqueous composition for the dyeing of human hair containing from 0.1 to 5 percent by weight of a mixture of component (a) and component (b) in substantially equimolar amounts, said component (a) being a pyrazolone of the formula

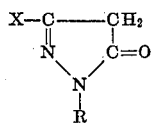

wherein R is a member selected from the group consisting of hydrogen and phenyl and X is a member selected from the group consisting of amino and hydroxyl and said component (b) being selected from the group consisting of 1. aromatic polyfunctional amines of the formula

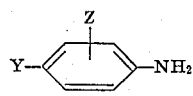

wherein Y is a member selected from the group consisting of OH, $NH_2$, NHR', NR'R'' and $NHC_6H_5$ and Z is a member selected from the group consisting of H, R', Y and OR', where R' and R'' are members selected from the group consisting of alkyl and hydroxyalkyl having from 1 to 4 carbon atoms, 2. 4-aminopyrazolones of the formula

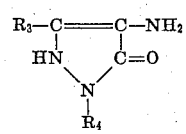

wherein $R_3$ is a member selected from the group consisting of hydrogen, phenyl, chlorophenyl, hydroxyphenyl, aminophenyl, alkylphenyl, alkylaminophenyl, dialkylaminophenyl, where the alkyls and alkylols have 1 to 4 carbon atoms, pyridyl, COOH, COOR', $CONH_2$, CONHR' and CONR'R'' where R' and R'' have the above defined meanings, and $R_4$ is a member selected from the group consisting of hydrogen, phenyl, hydroxyphenyl, sulfonylphenyl, sulfonaminophenyl, aminophenyl, carboxyphenyl, carbamidophenyl, alkylolphenyl, alkylphenyl, alkylaminophenyl, dialkylaminophenyl, where the alkyls and alkylol have 1 to 4 carbon atoms, and pyridyl, and 3. water-soluble acid addition salts of said 4-aminopyrazolones.

3. The aqueous composition for the dyeing of human hair of claim 2 wherein said composition has a further content of from 0.5 to 30 percent by weight of a surfactant.

4. The aqueous composition for the dyeing of human hair of claim 2 wherein said composition has a further content of from 0.1 to 25 percent by weight of thickeners.

5. The aqueous composition for the dyeing of human hair of claim 2 wherein said composition has a further content of an effective amount of a chemical oxidizing agent.

6. The process of claim 1 wherein said oxidative dyestuff mixture of component (a) and component (b) is present in an amount of from 0.1 to 2 percent by weight.

* * * * *